Patented Jan. 13, 1925.

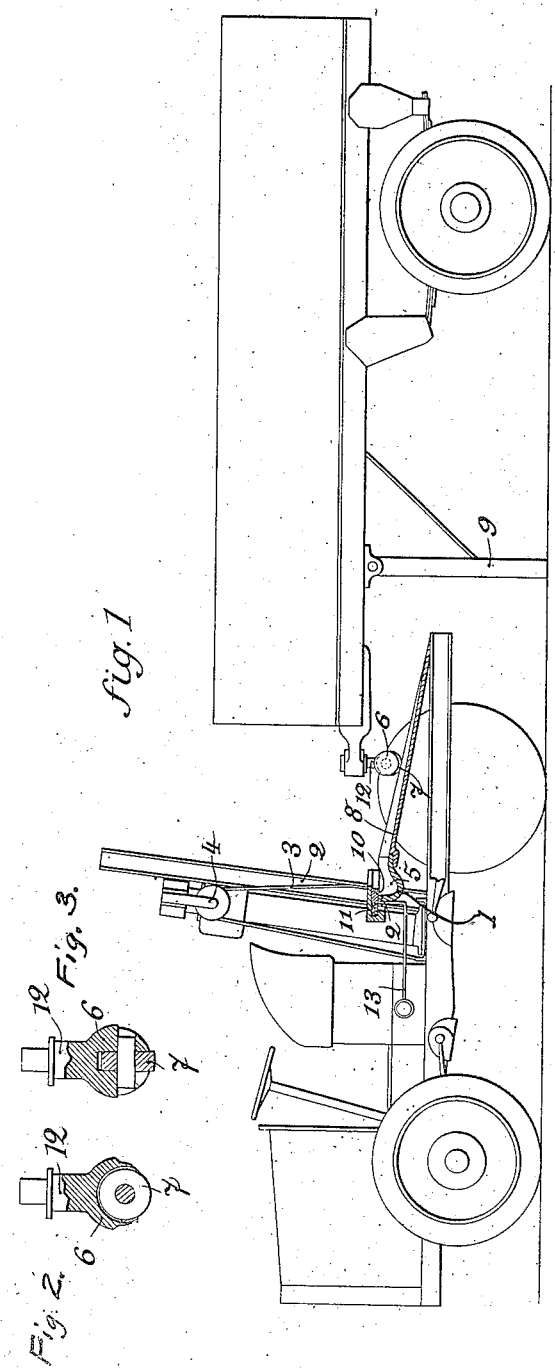

1,523,249

UNITED STATES PATENT OFFICE.

CHARLES BLUM, OF SURESNES, FRANCE.

TRACTOR WITH TRAILER HAVING TIPPING BODY.

Application filed September 27, 1922. Serial No. 590,908.

*To all whom it may concern:*

Be it known that I, CHARLES BLUM, a citizen of the Republic of France, and residing at Suresnes, Seine Department, 8 Quai du Marechal Gallieni, in the Republic of France, engineer, have invented certain new and useful Tractors with Trailers Having Tipping Bodies, of which the following is a specification.

For transportation by means of a tractor and trailer, it is often necessary to provide a trailer of the rear-tipping type. On the other hand, in order to obtain a saving of time and labour, attempts have been made to carry out the automatic coupling of the trailer and the tractor.

My invention relates to a tractor combined with a trailer having a rear-tipping body, and employing an automatic coupling, whereby all the operations may be performed in a very simple manner and with great rapidity. In this arrangement the tractor itself is provided with the tipping mechanism, so that it is not required to employ the same upon each trailer. Numerous systems of hoisting adapted for tipping purposes as well as systems of automatic coupling are already known, and these may be suitably combined in order to obtain the desired result.

Figure 1 is a side elevation of a tractor and trailer and a longitudinal section of a bracket mounted on the tractor.

Figure 2 is a detail vertical sectional view of the coupling head.

Figure 3 is a similar view taken at right angles to Fig. 2.

The following description, together with the accompanying drawings, set forth a preferred form of construction, this being illustrated partly in elevation and partly in section, Fig. 1.

The tractor is provided with a bracket 1 slidable in a guideway 2; said bracket may be raised by the cables 3 of a hoist 4 of any known type, but the hydraulic type is preferred for the present case. A hemi-spherical recess 5 is formed in said bracket wherein is disposed the spherical head 6 of the coupling element of the trailer. The said spherical head is provided in its middle plane with a roller 7 whereby it is enabled to roll upon the inclined plane situated at the rear of the tractor and ending at the level of the bracket 1, when the latter is lowered, Fig. 2.

The operation of said device is as follows. The trailer is supposed to be retained by a block 9 in the position indicated; the tractor moves backward, and the inclined plane 8 engages below the head 6 so as to raise the front part of the trailer which from this time no longer bears upon the block. As the tractor moves back, the head 6 continues to mount upon the inclined plane 8 until it drops into the recess 5 of bracket 1, but in order to fall into said recess, the head 6 is obliged to push back a locking bolt 10 by compressing a spring 11. When said head reaches the bottom of the recess, the said spring drives forward the bolt 10. The latter has a forked shape, and engages the head by fitting upon the neck 12. At this time the coupling operation is completed, and the trailer can no longer be separated from the tractor except under the driver's control.

To effect the rear tipping of the trailer, the driver while still remaining in his seat is only required to operate the control devices of the hoist 4, and the latter acts through the cables 3 in order to raise the bracket 1 in the guideway 2. In this movement, the trailer is pivoted on its axles, and the said axle also approaches the tractor, thus facilitating the discharge of the load. To bring back the trailer to the travelling position, it is simply necessary to allow the hoist to descend.

For uncoupling the trailer the driver draws upon a rod 13, and he is thus enabled to release the neck 12 of the head 6 by drawing back the bolt 10; at the same time the driver throws on the brake of the trailer while still in his seat, as the brake control is within reach of the hand. When this is done, he starts the tractor in a rapid manner. The head 6 leaves the recess 5 and descends along the inclined plane 8 until the block rests upon the ground.

Obviously, without departing from the spirit of the invention, any suitable variations may be made in the lifting mechanism, the automatic coupling elements, the method of guiding any one element with respect to another, and the like.

Claims:

1. In a tractor with trailer having a rear tipping body, the combination of a bracket having an upward and downward movement upon the tractor, a hemi-spherical recess formed in the said bracket, means for raising the said bracket, and a spherical head disposed at one end of the tipping body, and cooperating with the recess in said bracket.

2. In a tractor with trailer, the combination of a bracket having an upward and downward movement and wherein is formed a spherical recess, means for raising said bracket, a spherical head disposed at one end of the said tipping body, a roller disposed in the said spherical head, an inclined plane situated at the rear of the tractor and starting from the said bracket, and serving as a roller path for the said roller.

3. In a tractor with trailer having a rear tipping body, the combination of a bracket having an upward and downward movement and wherein is formed a spherical recess, means for raising said bracket, a spherical head disposed at one end of the said body and cooperating with the recess in said bracket, a locking bolt disposed above said cavity and adapted to maintain the said spherical head when the latter is engaged in said recess.

In testimony, that I claim the foregoing as my invention I have signed my name.

CHARLES BLUM.